US012183232B2

(12) United States Patent
Park

(10) Patent No.: US 12,183,232 B2
(45) Date of Patent: Dec. 31, 2024

(54) DISPLAY DEVICE

(71) Applicant: LG Display Co., Ltd., Seoul (KR)

(72) Inventor: Sanghyun Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/503,452

(22) Filed: Nov. 7, 2023

(65) Prior Publication Data

US 2024/0221558 A1 Jul. 4, 2024

(30) Foreign Application Priority Data

Dec. 30, 2022 (KR) ........................ 10-2022-0190662

(51) Int. Cl.
*G09G 3/00* (2006.01)

(52) U.S. Cl.
CPC ....... *G09G 3/006* (2013.01); *G09G 2330/021* (2013.01); *G09G 2330/04* (2013.01); *G09G 2330/12* (2013.01)

(58) Field of Classification Search
CPC ........................... G06F 11/1008; G06F 11/108
See application file for complete search history.

(56) References Cited

U.S. PATENT DOCUMENTS

| | | | | |
|---|---|---|---|---|
| 2019/0348007 | A1* | 11/2019 | Lee | G09G 3/3648 |
| 2021/0366402 | A1* | 11/2021 | In | G09G 3/3266 |
| 2021/0382518 | A1* | 12/2021 | Uytterhoeven | G06F 1/08 |
| 2024/0169873 | A1* | 5/2024 | Chen | G09G 3/3677 |

FOREIGN PATENT DOCUMENTS

KR 10-2379188 B1 3/2022

OTHER PUBLICATIONS

KR102379188B1 Display Device and Driving Method of the Same Mar. 25, 2022 (Year: 2022).*

* cited by examiner

*Primary Examiner* — Van N Chow
(74) *Attorney, Agent, or Firm* — Fenwick & West LLP

(57) ABSTRACT

Embodiments relate to a display device comprising a display panel on which a pixel is disposed; a gate driving circuit including a stage circuit that outputs a gate signal to the pixel according to voltages of Q node and QB node; a monitoring transistor connected to at least one of the Q node and QB node of the stage circuit; a power control unit that generates a compensation value according to a monitoring voltage output from the monitoring transistor and provides a driving voltage compensated according to the compensation value to the gate driving circuit; and a timing controller that detects an abnormal state of the monitoring transistor and controls an output of the compensation value.

19 Claims, 8 Drawing Sheets

DISPLAY DEVICE

CROSS REFERENCE TO RELATED APPLICATION

The present application claims priority to Republic of Korea Patent Application No. 10-2022-0190662, filed on Dec. 30, 2022, which is hereby incorporated by reference in its entirety.

BACKGROUND

Field

This disclosure relates to a display device.

Description of the Related Art

A display device includes a data driving circuit that supplies data signals to data lines of a pixel array, a gate driving circuit (or a scan driving circuit) that sequentially supplies gate pulses (or scan pulses) synchronized with the data signals to gate lines (or scan lines) of the pixel array, a timing controller that controls the data driving circuit and the gate driving circuit, and the like. Each of the pixels may include a thin film transistor (TFT) for supplying a voltage of the data line to a pixel electrode in response to the gate pulse.

The gate driving circuit includes a plurality of stages dependently connected to each other. Each of the stages includes a Q node for charging the gate line, a QB node for discharging the gate line, and a control circuit for controlling voltages of the Q node and QB node. The control circuit include transistors. Device characteristics of these transistors may deteriorate due to direct current (DC) gate bias stress, which may cause deterioration of the gate driving circuit.

In order to detect deterioration of the gate driving circuit, a method of sensing and compensating for the voltage of the QB node using a dummy stage may be used. However, since the dummy stage also includes thin film transistors, it may deteriorate or cause defects such as short circuits. In this case, a higher degree of deterioration of the gate driving circuit may be sensed by the dummy stage, and thus a higher driving voltage than required may be applied to the gate driving circuit. This is a problem because it can further accelerate deterioration of the gate driving circuit and increase unnecessary power consumption.

SUMMARY

Embodiments provide a display device capable of detecting deterioration of a gate driving circuit.

Embodiments provide a display device that detects the abnormal deterioration of a circuit element itself that detects the deterioration of the gate driving circuit.

In one embodiment, a display device comprises: a display panel including a pixel; a gate driving circuit including a stage circuit, the stage circuit configured to output a gate signal to the pixel according to voltages of a Q node and a QB node of the stage circuit; a monitoring transistor connected to at least one of the Q node and QB node of the stage circuit, the monitoring transistor configured to output a monitoring voltage based on the voltages of the Q node and the Qb node; a power control circuit configured to generate a compensation value that compensates a driving voltage according to the monitoring voltage output from the monitoring transistor, and outputs the driving voltage compensated with the compensation value to the gate driving circuit; and a timing controller configured to detect an abnormal state of the monitoring transistor based on the compensated driving voltage and controls whether the compensation value is output to compensate the driving voltage.

In one embodiment, a display device comprises: a gate driving circuit configured to output a gate signal to a pixel; a monitoring transistor configured to output a monitoring voltage that is indicative of a deterioration of the gate driving circuit; a power control unit configured to receive the monitoring voltage and generate a compensation value corresponding to monitoring voltage that is indicative of the deterioration of the gate driving circuit, and outputs a driving voltage that is compensated with the compensation value to the gate driving circuit; a monitoring circuit configured to detect an abnormal state of the monitoring transistor based on the compensation value; and a timing controller that blocks an output of the compensation value and outputs a driving voltage of a preset level to the gate driving circuit responsive to detection of the monitoring transistor being in the abnormal state by the monitoring circuit.

In one embodiment, a display device comprises: a display panel including a pixel; a gate driving circuit including a stage circuit that is configured to output a gate signal to the pixel according to voltages of a Q node and a QB node of the stage circuit; a monitoring transistor included in the display panel and connected to the Q node or the QB node of the stage circuit, the monitoring transistor configured to output a monitoring voltage based on one of a voltage of the Q node or a voltage of the QB node; a power control circuit including an amplifier having a first input that receives the monitoring voltage and a second input that receives a reference voltage, the power control circuit configured to output a compensation value based on a difference between the monitoring voltage and the reference voltage, and outputs a driving voltage that is compensated with the compensation value to the gate driving circuit; a monitoring circuit including a plurality of resistors connected in series and a switching transistor, the switching transistor including a gate electrode connected to the plurality of resistors, a first electrode connected to a predetermined voltage, and a second electrode that outputs an enable signal that is indicative of an abnormal state of the monitoring transistor responsive to the compensated driving voltage matching a turn-on voltage of the switching transistor; and a timing controller that is connected to the monitoring circuit and is configured to control the power control circuit to switch from outputting the driving voltage that is compensated with the compensation value to outputting a predefined driving voltage to the gate driving circuit responsive to receiving the enable signal from the monitoring circuit.

DETAILED DESCRIPTION

Figure 1:
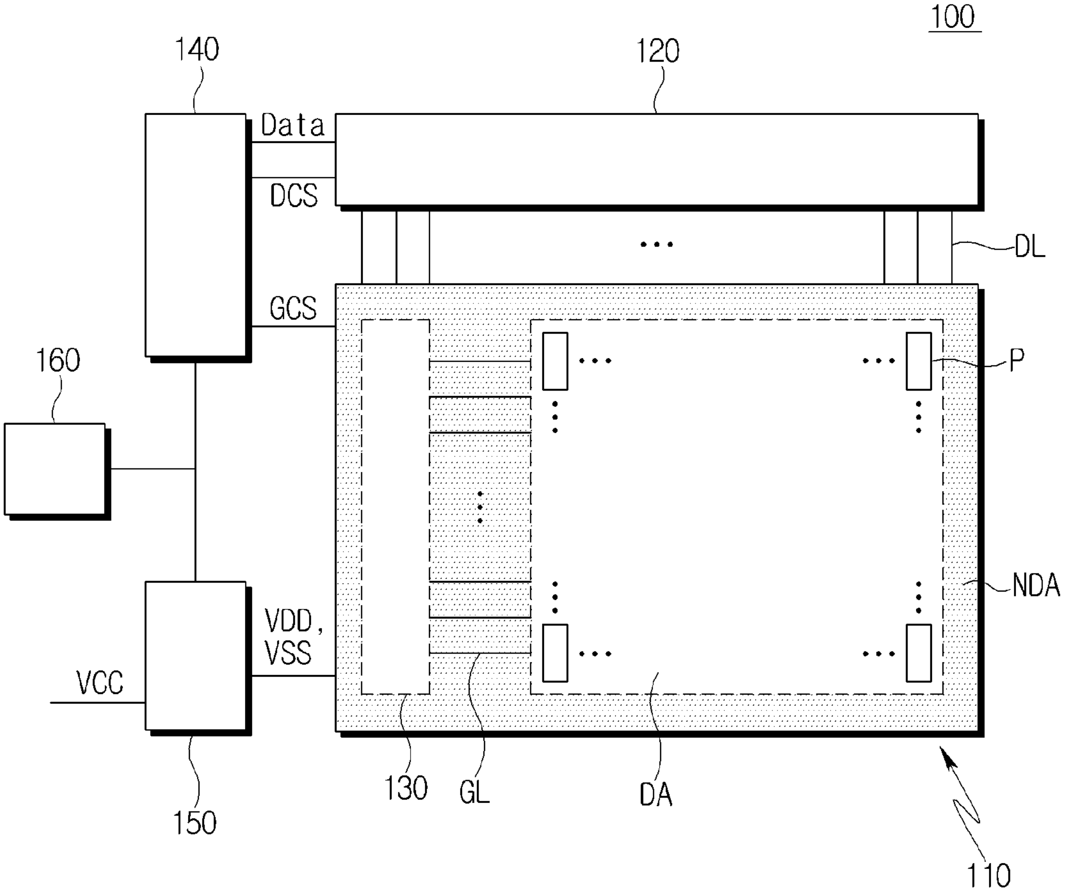
FIG. 1 is a block diagram illustrating a configuration of a display device according to an embodiment.

Hereinafter, embodiments will be described with reference to the accompanying drawings. In the specification, when an element (area, layer, part, or the like) is referred to as being "on", "coupled to", or "combined with" another element, it may be directly on/coupled to/combined with another element or a third element may be disposed therebetween.

The same reference numerals refer to same elements. In the drawings, the thicknesses, ratios, and sizes of the elements are exaggerated for effective description of the technical details. The term "and/or" includes one or more combinations that the associated elements may define.

Terms first, second, etc. can be used to describe various elements, but the elements are not to be construed as being limited by the terms. The terms are only used to differentiate one element from other elements. For example, the first element may be named the second element without departing from the scope of the embodiments, and the second element may also be similarly named the first element. As used herein, the singular forms are intended to include the plural forms as well, unless the context clearly indicates otherwise.

The terms "under", "below", "on", "above", and the like are used herein for describing relationship between two or more elements shown in the drawings. These terms are relative concepts and are described on the basis of the direction in the drawings.

It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

FIG. 1 is a block diagram illustrating a configuration of a display device according to an embodiment.

Referring to FIG. 1, a display device 100 may include a display panel 110 and a display panel driving circuit.

The display panel 110 may include a display area DA where an image is displayed and a non-display area NDA around the display area DA where an image is not displayed. The display area DA includes data lines DLs, gate lines GLs crossing the data lines DLs, and an array of pixels Ps (pixel arrays) defined by the data lines DLs and the gate lines GLs. At least some of the driving circuits may be mounted in the non-display area NDA.

The pixels Ps may include red (R), green (G), and blue (B) sub-pixels for color implementation. The pixels Ps may further include a white (W) sub-pixel in addition to the RGB sub-pixels. The present embodiment is not limited thereto, and the pixels Ps may include cyan (C), magenta (M), and yellow (Y) sub-pixels.

Each pixel P may include transistors formed at intersections of corresponding data lines DLs and gate lines GLs, storage capacitors, and light emitting elements connected thereto. The pixel P may emit light in response to the amount of current flowing through the light emitting element according to the control of the transistors.

The display panel driving circuit may include a data driving circuit 120, a gate driving circuit 130, a timing controller 140, and a power control unit 150.

The timing controller 140 receives a timing signal transmitted from an external system (not illustrated) and generates a data control signal DCS and a gate control signal GCS. The timing signal may include a data enable signal, a horizontal synchronization signal, a vertical synchronization signal, a clock signal, or the like. The data control signal DCS is output to the data driving circuit 120 and the gate control signal GCS is output to the gate driving circuit 130. The timing controller 140 generates digital image data Data from an image signal transmitted from an external system and outputs it to the data driving circuit 120.

The data driving circuit 120 converts digital image data into analog data voltage according to the data control signal DCS. The data driving circuit 120 may apply the analog data voltage to the corresponding pixels Ps through the data line DL. In an embodiment, a multiplexer (not illustrated) may be disposed between the data driving circuit 120 and the data lines DLs. The multiplexer may distribute the data voltage input from the data driving circuit 120 to the data lines DLs under the control of the timing controller 140.

The gate driving circuit 130 may sequentially output gate voltages by one horizontal period through the gate line GL in response to the gate control signal GCS. Accordingly, the pixel rows connected to each gate line GL are turned on by one horizontal period. The gate driving circuit 130 may include stage circuits respectively connected to a plurality of gate lines GLs, and may include, as illustrated, a Gate In Panel (GIP) mounted on the non-display area NDA of the display panel 110.

The power control unit 150 (e.g., a circuit) converts an external voltage VCC input from the outside into a high-potential voltage VDD and a low-potential voltage VSS, which are standard power sources used inside the display device 100 to output the converted voltage to the gate driving circuit 130. The power control unit 150 may include a voltage amplifier to convert the external voltage VCC into the high-potential voltage VDD and the low-potential voltage VSS.

Figure 2:
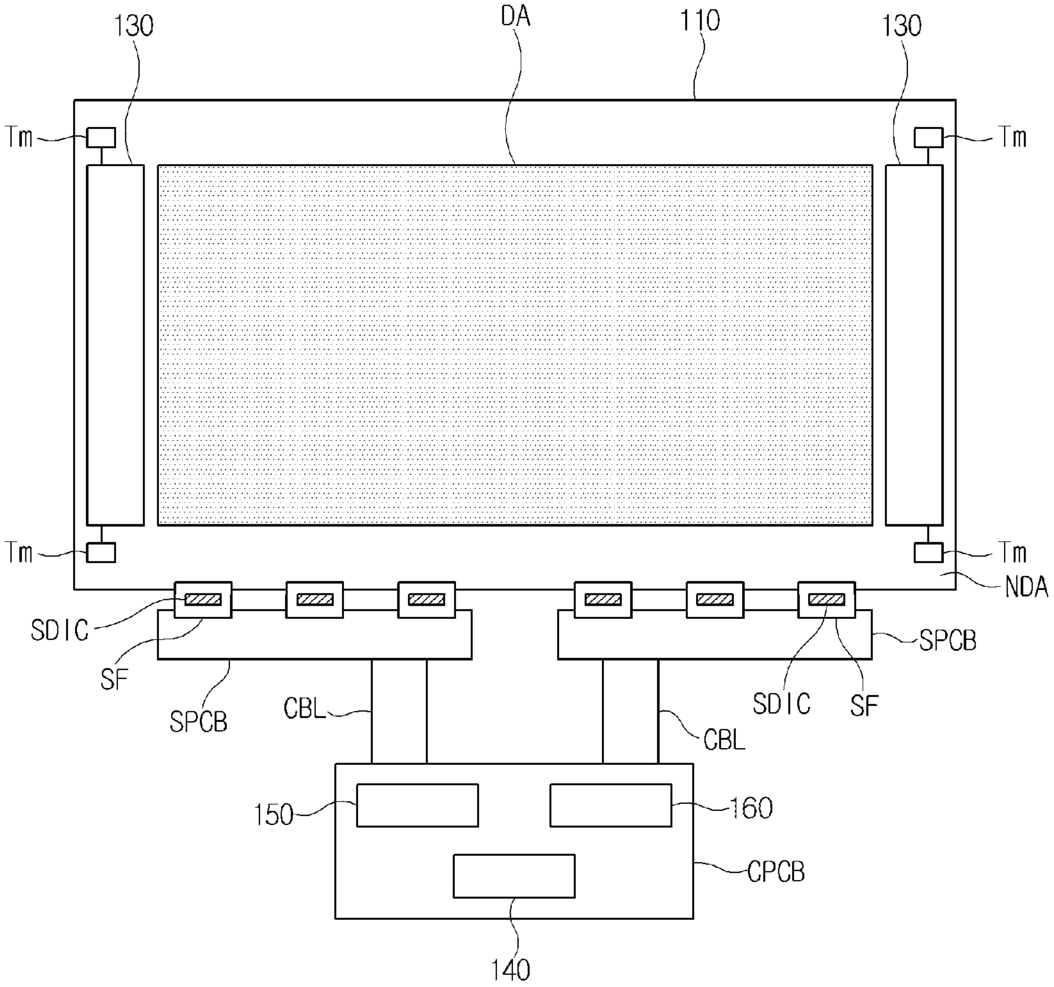
FIG. 2 is an exemplary diagram illustrating implementation of a display device according to an embodiment.

FIG. 2 is an exemplary diagram illustrating implementation of a display device according to an embodiment.

Referring to FIG. 2, the display panel 110 may include a display area DA where an image is displayed and a non-display area NDA where an image is not displayed.

The data driving circuit 120 may include one or more source driver integrated circuits SDICs. Each source driver integrated circuit SDIC may include a shift register, a latch circuit, a digital to analog converter, an output buffer, and the like. Each source driver integrated circuit SDIC may further include, in some cases, an analog to digital converter.

Each source driver integrated circuit SDIC may be connected to the display panel 110 using a tape automated bonding (TAB) method, or may be connected to the bonding pad of the display panel 110 using a chip on glass (COG) or chip on panel (COP) method, or may be connected to the display panel 110 using a chip on film (COF) method. In this case, each source driver integrated circuit SDIC may be mounted on a circuit film SF connected to the non-display area NDA of the display panel 110.

The data driving circuit 120 may be connected to one side (e.g., upper or lower side) of the display panel 110. Depending on the driving method and the panel design method, the data driving circuit 120 may be connected to both sides (e.g., upper and lower sides) of the display panel 110 or may be connected to two or more of the four sides of the display panel 110. As shown in FIG. 2, the data driving circuit 120 including source driver integrated circuits SDICs may be connected to the lower side of the display panel 110.

The gate driving circuit 130 may be implemented as a GIP type. In this case, the gate driving circuit 130 may be disposed in the non-display area NDA of the display panel 110. In another embodiment, the gate driving circuit 130 may be implemented as a COF (chip on film) type.

The gate driving circuit 130 may be connected to one side (the left or right side) or both sides of the display panel 110 as illustrated. Depending on the driving method and the panel design method, the gate driving circuit 130 may be connected to both sides (e.g., left and right sides) of the display panel 110 or may be connected to two or more of the four sides of the display panel 110.

In other embodiments, at least one driving circuit of the data driving circuit 120 and the gate driving circuit 130 may be disposed in the display area DA. For example, at least one of the data driving circuit 120 and the gate driving circuit 130 may be disposed not to overlap (e.g., non-overlapping) the pixels Ps, or may be disposed to partially or entirely overlap the pixels Ps.

The display device 100 may include at least one source printed circuit board SPCB for electrical connection between one or more source driver integrated circuits SDICs and other devices and a control printed circuit board CPCB on which control components and a variety of electrical devices are mounted.

A film SF on which a source driver integrated circuit SDIC is mounted may be connected to at least one source printed circuit board SPCB. That is, the film SF on which the source driver integrated circuit SDIC is mounted may have one side electrically connected to the display panel 110 and the other side electrically connected to the source printed circuit board SPCB.

The timing controller 140 and the power control unit 150 may be mounted on the control printed circuit board CPCB. The timing controller 140 may perform overall control functions related to the driving of the display panel 110 and may control operations of the data driving circuit 120 and the gate driving circuit 130. The power control unit 150 may supply various voltages or currents to the data driving circuit 120 and the gate driving circuit 130 or may control various voltages or currents to be supplied. The timing controller 140 may be implemented with various circuits or electronic components such as an integrated circuit (IC), a field programmable gate array (FPGA), an application specific integrated circuit (ASIC), or a processor.

The at least one source printed circuit board SPCB and the control printed circuit board CPCB may be electrically connected through at least one connection cable CBL. Here, the connection cable CBL may be, for example, a flexible printed circuit (FPC), a flexible flat cable (FFC) or the like.

The at least one source printed circuit board SPCB and the control printed circuit board CPCB may be integrated into one printed circuit board and implemented.

In an embodiment, the display device 100 may include one or more monitoring transistors Tm formed on the display panel 110 as illustrated in FIG. 2. As illustrated, the monitoring transistor Tm may be distributed and disposed adjacent to a plurality of corners (e.g., four corners) of the display panel 110 in the non-display area NDA, but is not limited thereto. The monitoring transistor Tm may be connected to at least one node of the gate driving circuit 130, for example, a Q node and/or a QB node, which will be described later.

Each monitoring transistor Tm may transmit a monitoring voltage reflecting the degree of deterioration of the circuit element constituting the gate driving circuit 130 to the timing controller 140 or the power control unit 150.

Figure 3:
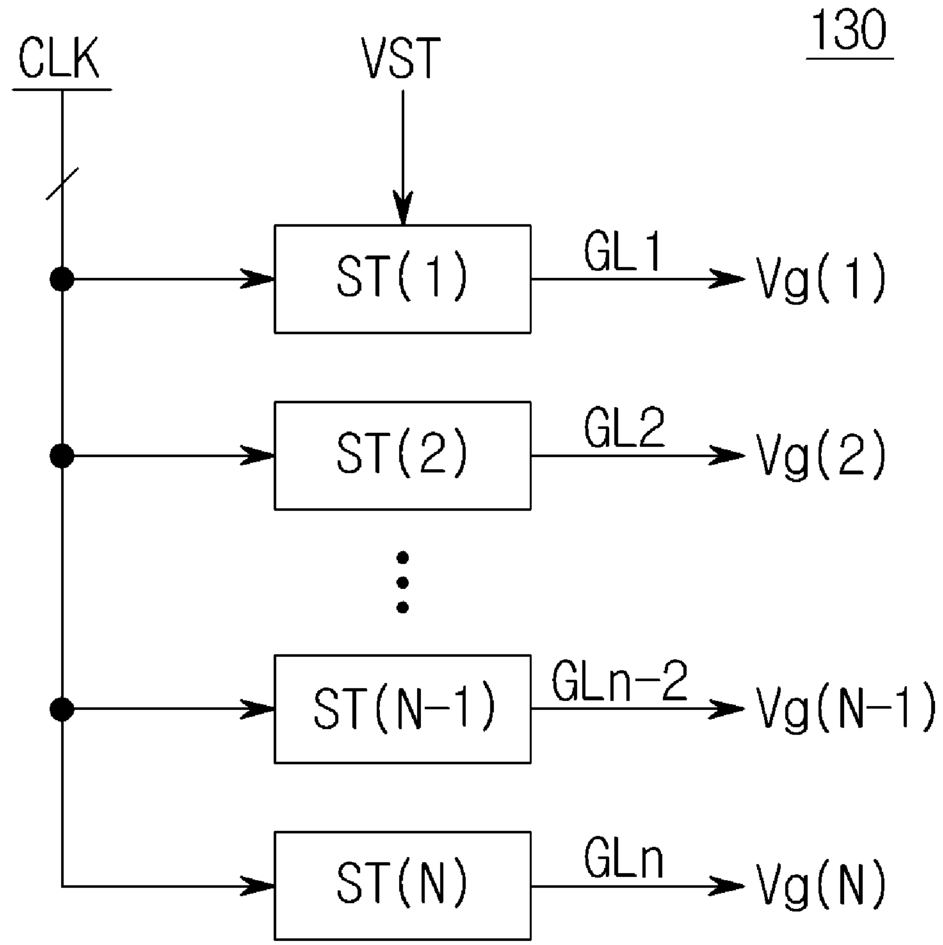
FIG. 3 is a diagram schematically illustrating a configuration of a gate driving circuit according to an embodiment.

FIG. 3 is a diagram schematically illustrating a configuration of a gate driving circuit according to an embodiment.

Referring to FIG. 3, the gate driving circuit 130 may include a plurality of stage circuits ST(1) to ST(N). The stage circuits ST(1) to ST(N) sequentially output gate voltages Vg(1) to Vg(N) to gate lines GL1 to GLn in response to the gate shift clock CLK and gate start signal VST provided from the timing controller 140 (FIG. 1).

The gate voltages Vg(1) to Vg(N) may be pulse signals swinging between a gate high voltage and a gate low voltage. In one embodiment, the gate high voltage is a voltage greater than a threshold voltage of transistors disposed in the pixel array. In one embodiment, the gate low voltage is a voltage less than the gate high voltage and a threshold voltage of transistors disposed in the pixel array. The transistors of the pixel array may be turned on in response to the gate high voltage to receive a data voltage.

Figure 4:
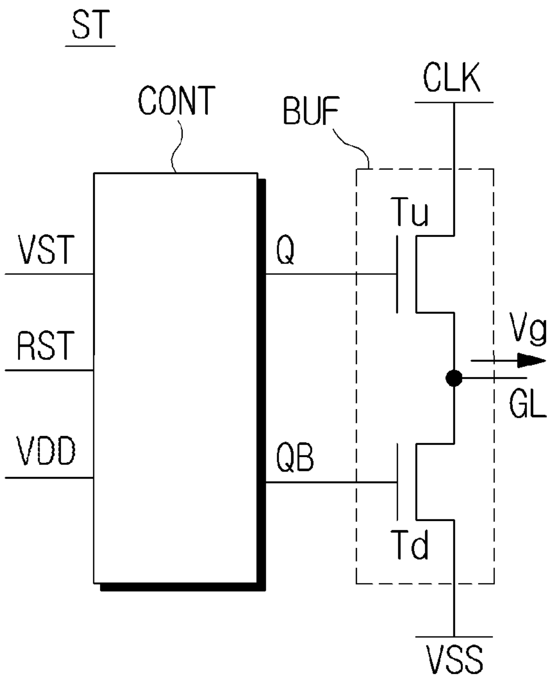
FIG. 4 is a diagram schematically illustrating a stage circuit in FIG. 3 according to an embodiment.

FIG. 4 is a diagram schematically illustrating a stage circuit in FIG. 3 according to one embodiment.

Referring to FIG. 4, the stage circuit ST may output a gate voltage Vg using the gate shift clock CLK. In the illustrated embodiment, one stage circuit ST receives one gate shift clock CLK and outputs one gate voltage Vg, but the present embodiment is not limited thereto. That is, the one stage circuit ST may be configured to receive one or more gate shift clocks CLK and output a corresponding number of gate voltages Vg.

The stage circuit ST may be connected to a Q node Q and a QB node QB of a control circuit CONT, and may include a buffer circuit BUF that receives the gate shift clock CLK and outputs it as a gate voltage Vg. In one embodiment, the control circuit CONT controls the buffer circuit BUF.

The control circuit CONT may receive the gate start signal VST, the reset signal RST, or the like and the input signals may be controlled by the operation of the buffer circuit BUF.

The buffer circuit BUF may include a pull-up transistor Tu and a pull-down transistor Td. The pull-up transistor Tu and the pull-down transistor Td may be connected in series between a node to which the low-potential voltage VSS is applied and a node which the gate shift clock CLK is applied is applied. A corresponding gate line GL is connected between the pull-up transistor Tu and the pull-down transistor Td to output a gate voltage Vg.

To this end, the pull-up transistor Tu may be connected to the Q node Q. The pull-up transistor Tu may be turned on according to the voltage at the Q node Q controlled by the control circuit CONT to output the gate shift clock CLK as the gate voltage Vg.

The pull-down transistor Td may be connected to the QB node QB. The pull-down transistor Td may be turned on according to the voltage at the QB node QB controlled by the control circuit CONT to output the low-potential voltage VSS as the gate voltage Vg.

Figure 5:
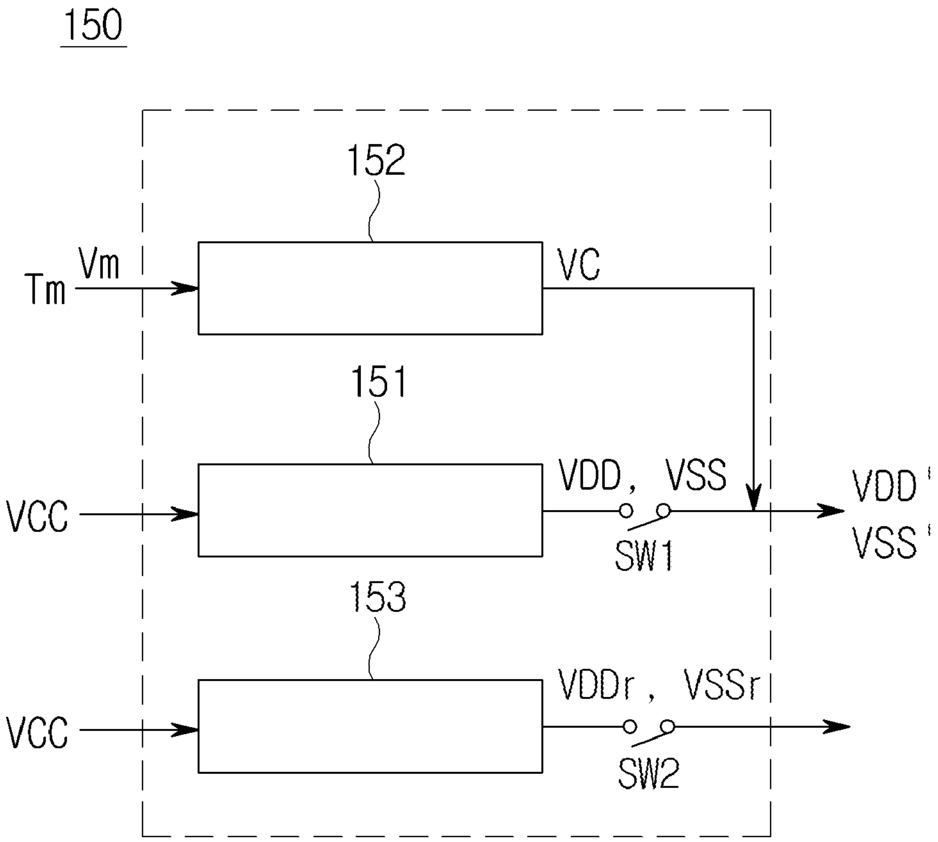
FIG. 5 is a diagram illustrating a configuration of a power control unit according to an embodiment.

FIG. 5 is a diagram illustrating a configuration of a power control unit 150 according to an embodiment.

The power control unit 150 includes a first power converter 151 (e.g., a circuit) and a second power converter 153 (e.g., circuit) respectively outputting a high-potential voltage VDD and a low-potential voltage VSS, and a power compensator 152 (e.g., a circuit) outputting a compensation value VC for the high-potential voltage VDD and the low-potential voltage VSS.

The first power convertor 151 converts the external voltage VCC input from the outside into the high-potential voltage VDD and the low-potential voltage VSS, which are standard power sources used inside the display device 100, and outputs the converted voltage. The first power converter 151 includes a voltage amplifier and outputs the converted voltage as one of the high-potential voltage VDD or the low-potential voltage VSS.

The second power convertor 153 converts the external voltage VCC input from the outside into a high-potential voltage VDDr and low-potential voltage VSSr of preset levels and outputs the converted voltage. For example, the second power convertor 153 converts a preset voltage value indicated by n-bit binary data from the timing controller 140 or the like into the high-potential voltage VDDr and the low-potential voltage VSSr and outputs the converted voltage values. To this end, the second power converter 153 may include a digital-to-analog converter (DAC).

The power compensator 152 outputs a voltage, for example, a compensation value VC of the high-potential voltage VDD, using the monitoring voltage Vm applied through the monitoring transistor Tm. The compensation value VC is added to the high-potential voltage VDD and the low-potential voltage VSS output from the first power converter 151 to produce a compensated high-potential voltage VDD' and a compensated low-potential voltage VSS', and the compensated high-potential voltage VDD' and the compensated low-potential voltage VSS' may be output to the gate driving circuit 130. Here, the monitoring voltage Vm reflects the degree of deterioration of the gate driving circuit 130 connected to the monitoring transistor Tm, and may reflect the deterioration of the monitoring transistor Tm itself and/or device characteristics of the monitoring transistor Tm. When a device defect occurs in the monitoring transistor Tm, the compensation value VC based on the monitoring voltage Vm increases, so that the compensated driving voltage VDD' applied to the gate driving circuit 130 may rise unnecessarily.

To solve this problem, in an embodiment, the display device 100 may be configured to detect an abnormal state of the monitoring transistor Tm. Hereinafter, this configuration will be described in more detail.

Figure 6:
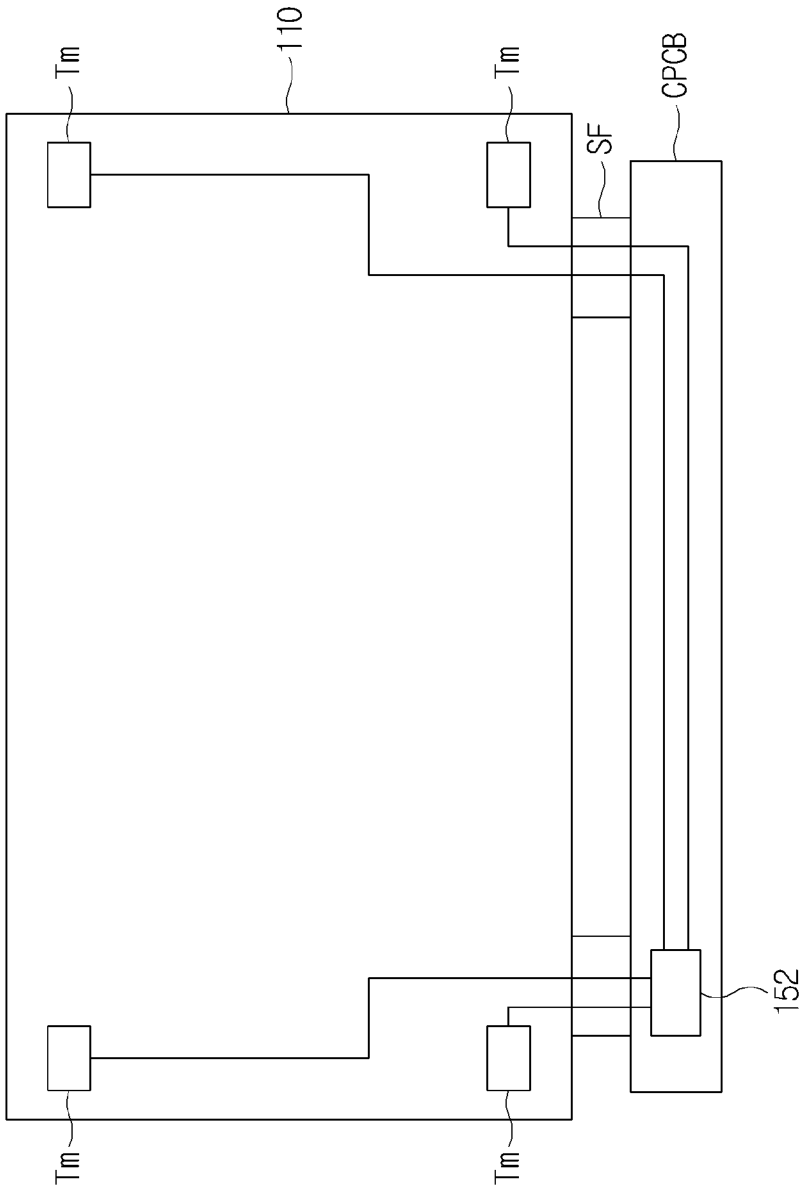
FIGS. 6 and 7 are diagrams for explaining a connection relationship between a monitoring transistor and a power compensator according to an embodiment.
Figure 7:
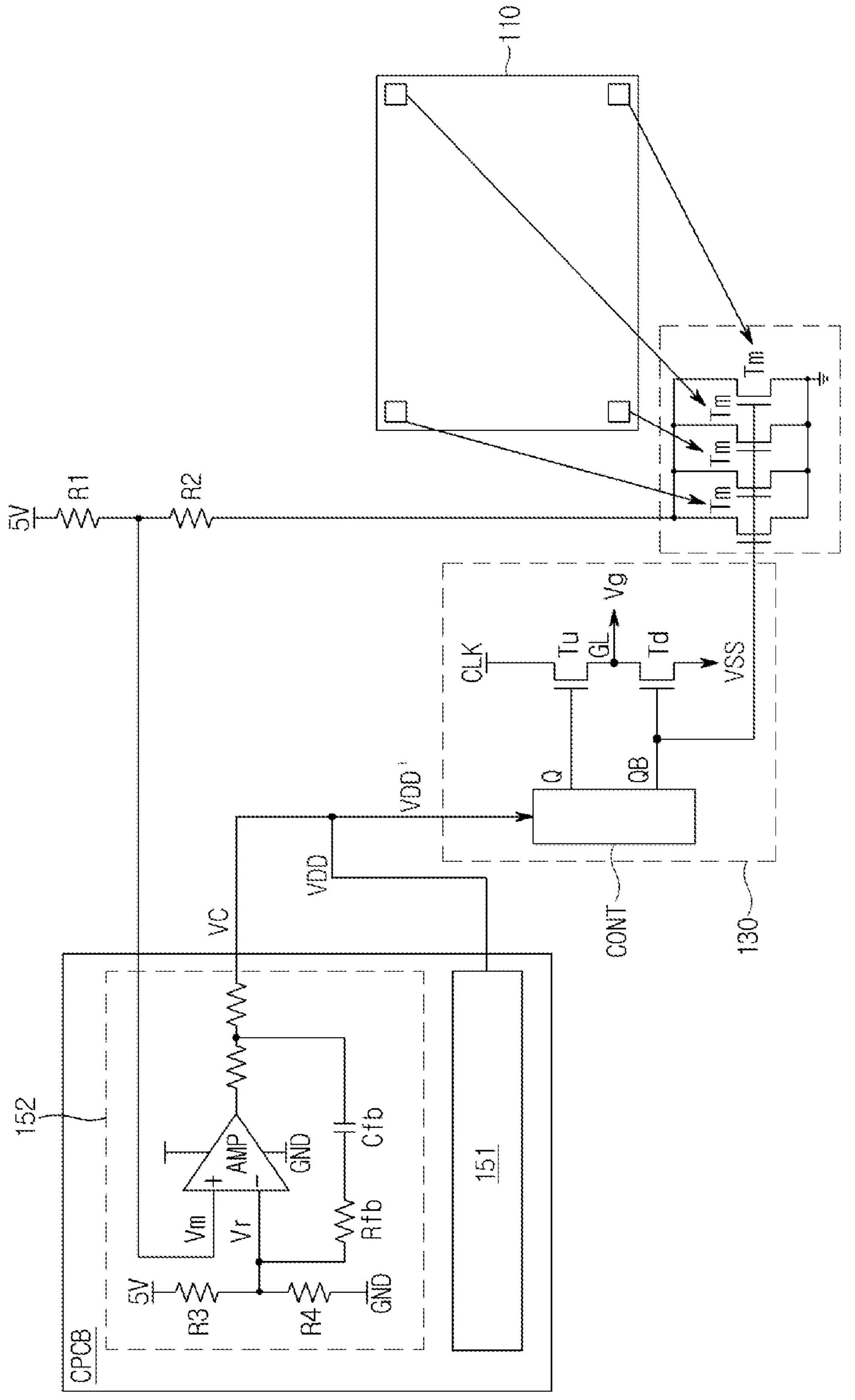

FIGS. 6 and 7 are diagrams for explaining a connection relationship between a monitoring transistor and a power compensator according to one embodiment.

Referring to FIG. 6, the monitoring transistor Tm may be distributed and disposed adjacent to four corners of the display panel 110 as illustrated, but is not limited thereto.

The monitoring transistor Tm is turned on according to the voltages at the Q node Q and/or the QB node QB to supply the monitoring voltage Vm to the power compensator 152. Each of the plurality of monitoring transistors Tm may be connected to the power compensator 152 disposed on the control printed circuit board CPCB through a wire passing through the circuit film SF. For clarity, the source printed circuit board SPCB and connection cable CBL illustrated in FIG. 2 are omitted, but the wire may be connected to the power compensator 152 via the circuit film SF, the source printed circuit board SPCB and the connection cable CBL.

Referring to FIG. 7, the power compensator 152 may be mounted on the control printed circuit board CPCB as a part of the power control unit 150. The power compensator 152 compares the monitoring voltage Vm from the monitoring transistor Tm with a reference voltage Vr, amplifies the difference between the monitoring voltage Vm and the reference voltage Vr, and outputs a compensation value VC. Therefore, the compensation value VC is generated by the power compensator 152 as a voltage that varies in proportion to the difference between the monitoring voltage Vm and the reference voltage Vr.

The compensation value VC is a voltage added to the high-potential voltage VDD or the low-potential voltage VSS to compensate for the high-potential voltage VDD or the low-potential voltage VSS. Here, the high-potential voltage VDD is a voltage for charging the Q node Q or the QB node QB. The low-potential voltage VSS is a voltage for discharging the Q node Q or the QB node QB.

Referring further to FIG. 7, each monitoring transistor Tm may be connected to the Q node Q and/or QB node QB of the gate driving circuit 130. In the illustrated embodiment, the monitoring transistors Tm are illustrated as being connected to the QB node QB, but the present embodiment is not limited thereto.

In an embodiment, the monitoring transistor Tm is a transistor having substantially the same structure and characteristics as the pull-down transistor Td, and its gate electrode may be connected to the QB node QB together with the gate electrode of the pull-down transistor Td. In another embodiment, when the monitoring transistor Tm is connected to the Q node Q, the monitoring transistor Tm is a transistor having substantially the same structure as the pull-up transistor Tu, and its gate electrode may be connected to the Q node Q together with the gate electrode of the pull-up transistor Tu.

When the pull-down transistor Td is degraded due to gate bias stress, since the monitoring transistor Tm sharing the QB node QB is also subjected to the stress applied to the pull-down transistor Td, the monitoring transistor Tm is deteriorated at the same level as that of the pull-down transistor Td. That is, the monitoring transistor Tm deteriorates at a same rate as the pull-down transistor Td or the pull-up transistor Tu depending on whether the monitoring transistor Tm is connected to the pull-down transistor Td or the pull-up transistor Tu. Therefore, the monitoring transistor Tm may be used to detect a deterioration of the pull-down transistor Td. Similarly, when the monitoring transistor Tm shares the Q node Q with the pull-up transistor Tu, the monitoring transistor Tm may be used to detect a deterioration of the pull-up transistor Tu.

The power compensator 152 is connected to one electrode of the monitoring transistor Tm and receives the monitoring voltage Vm. For example, the power compensator 152 includes an operational amplifier AMP that amplifies the difference between two input signals.

A reference voltage Vr is applied to the inverting input terminal (−) of the operational amplifier AMP. One electrode of the monitoring transistor Tm is connected to the non-inverting input terminal (+) of the operational amplifier AMP. The monitoring voltage Vm is applied from the monitoring transistor Tm to the non-inverting input terminal (+) of the operational amplifier AMP. In this case, the monitoring voltage Vm may be a predetermined voltage determined by distributing the voltage transmitted from the monitoring transistor Tm through the first resistor R1 and the second resistor R2. In this case, a predetermined high-potential voltage may be applied to the first resistor R1 and the second resistor R2. Here, the high-potential voltage may be 5V, but is not limited thereto.

At least one of a feedback capacitor Cfb and a feedback resistor Rfb may be connected between the inverting input terminal (−) and output terminal of the operational amplifier AMP. A predetermined reference voltage Vr determined by distributing a predetermined high-potential voltage through a third resistor R3 and a fourth resistor R4 is applied to the inverting input terminal (−) of the operational amplifier AMP. The high-potential voltage may be, for example, 5V, but is not limited thereto.

The reference voltage Vr may be set as a voltage that does not impose excessive stress on the initial operation of the power compensator 152, by the use of the reference voltage Vr, a deterioration of the monitoring transistor Tm may be detected from an initial low voltage, and the reference voltage Vr may correspond to deterioration of the gate driving circuit 130 in a use environment. The reference voltage Vr may vary according to the model or driving characteristics of the display device 100 and may be experimentally determined.

The operational amplifier AMP outputs a compensation value VC based on the difference between the two input signals. As the difference between the monitoring voltage Vm and the reference voltage Vr increases, the voltage level of the compensation value VC output from the operational amplifier AMP rises. Therefore, when the threshold voltage of the monitoring transistor Tm shifts due to gate bias stress and the monitoring voltage Vm is lowered, the operational amplifier AMP may increase the compensation value VC until the monitoring voltage Vm and the reference voltage Vr become equal.

More specifically, the power compensator 152 senses the degree of deterioration based on the current drop of the monitoring transistor Tm compared to the initial on current of the monitoring transistor Tm. Also, the power compensator 152 increases the compensation value VC starting from the initial value. As the monitoring transistor Tm deteriorates due to the gate bias stress, the on current decreases. This current drop is converted into a monitoring voltage Vm through the resistors R1, R2, and the monitoring voltage Vm is input to the operational amplifier AMP to be compared with the reference voltage Vr.

The operational amplifier AMP increases the compensation value VC until the monitoring voltage Vm becomes equal to the reference voltage Vr. The compensation value VC adjusted to increase is added to the high-potential voltage VDD generated by the first power converter 151 to compensate for the high-potential voltage VDD. The compensated high-potential voltage VDD' is a driving voltage of the gate driving circuit 130, and is applied to the gate driving circuit 130 to raise the voltage at the QB node QB (or Q node Q) to a sufficient level as required, thereby supplying the raised voltage to the gate driving circuit 130.

In this embodiment, the monitoring voltage Vm may not reflect the actual degree of deterioration of the gate driving circuit 130 due to a defect in the monitoring transistor Tm itself. In this case, the monitoring voltage Vm measured by the monitoring transistor Tm may reflect greater deterioration than the actual degree of deterioration of the gate driving circuit 130. This further increases the compensation value VC generated by the power compensator 152 and consequently increases the driving voltage applied to the gate driving circuit 130. Then, a high voltage is applied to the gate driving circuit 130 to further accelerate deterioration and cause unnecessary power consumption.

In an embodiment, the display device 100 further includes a monitoring unit 160 (e.g., a monitoring circuit) (FIG. 8) for determining a defect in the monitoring transistor Tm itself.

Hereinafter, an example of the display device 100 including the monitoring unit 160 will be described in more detail.

Figure 8:
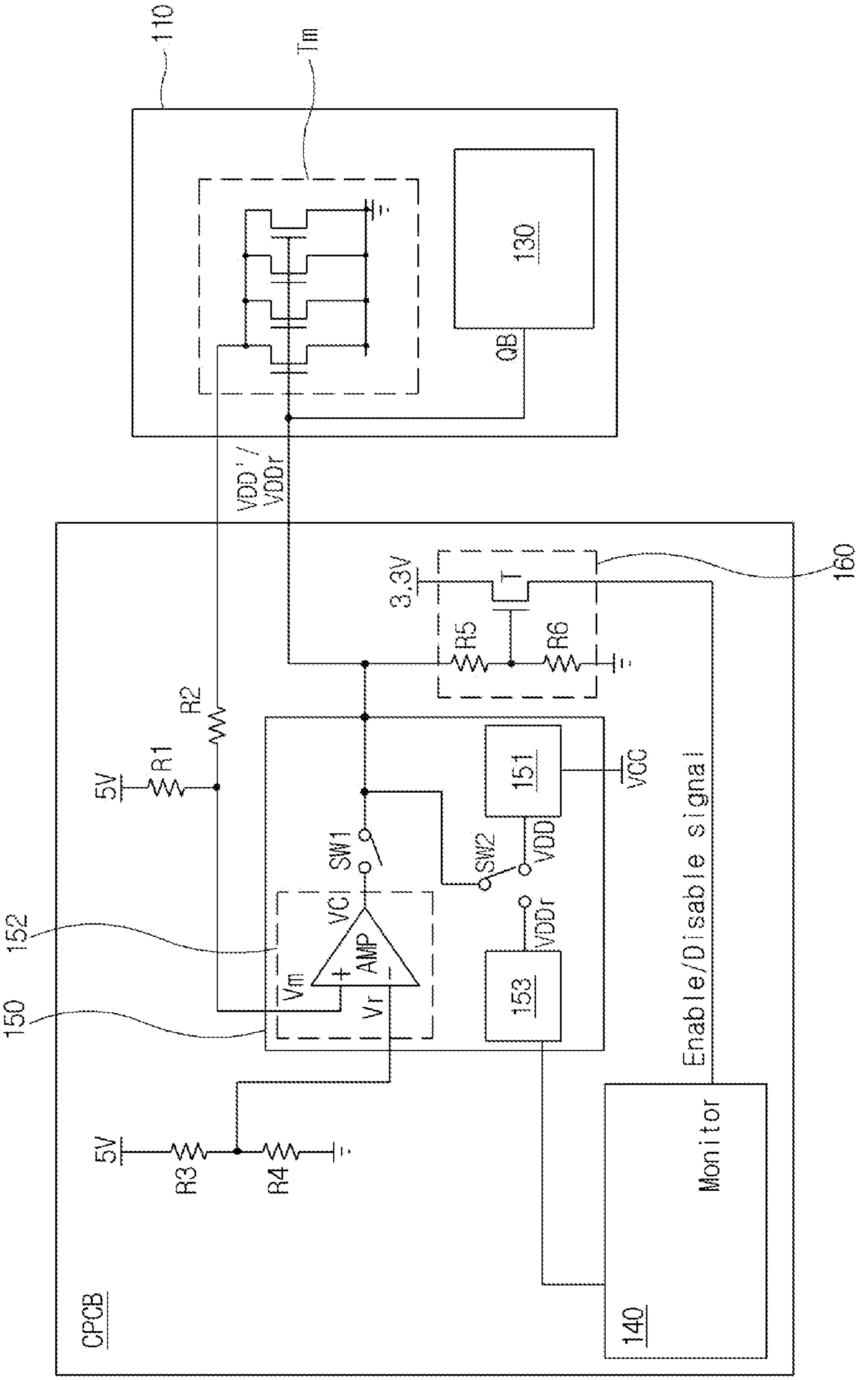
FIG. 8 is a diagram illustrating a connection relationship of some components of a display device including a monitoring unit according to an embodiment.

FIG. 8 is a diagram illustrating a connection relationship of some components of a display device including a monitoring unit. Specifically, FIG. 8 schematically illustrates the connection relationship among the display panel 110 on which the gate driving circuit 130 and the monitoring transistor Tm are disposed, the timing controller 140, the power control unit 150, and the monitoring unit 160.

Referring to FIG. 8, in an embodiment, the display device 100 may further include the monitoring unit 160. The monitoring unit 160 (e.g., a circuit) is provided to assist in detecting deterioration of the gate driving circuit 130. For example, as will be described later, the display device 100 may include at least one monitoring transistor Tm for detecting deterioration of the gate driving circuit 130, and the monitoring unit 160 may be configured to detect the deterioration of the monitoring transistor Tm. The magnitudes of the driving voltages applied to the gate driving circuit 130, for example, high-potential voltages (VDD', VDDr) may be controlled based on the degree of deterioration of the monitoring transistor Tm determined by the monitoring unit 160 and the degree of deterioration of the gate driving circuit 130 detected by the monitoring transistor Tm.

The monitoring unit 160 may include a switching transistor T that is turned on or off in response to an input voltage to a gate electrode of the switching transistor T. The switching transistor T may include one end (e.g., a first electrode such as a drain electrode) connected to a predetermined voltage (e.g., 3.3V) and the other end (e.g., a second electrode such as a source electrode) connected to a monitoring input pin Monitor of the timing controller 140. The gate electrode of the switching transistor T is connected to an output terminal of the operational amplifier AMP of the power compensator 152. In an embodiment, the gate electrode of the switching transistor T may be connected to the output terminal of the operational amplifier AMP through a fifth resistor R5 and a sixth resistor R6 that is connected in series with the fifth transistor R5. The gate electrode of the switching transistor T may receive a predetermined voltage determined by distributing the compensation value VC output from the operational amplifier AMP through the resistors R5 and R6.

In this embodiment, a first switch SW1 which turn on and turn off is controlled by the timing controller 140 may be further connected to the output terminal of the operational amplifier AMP. As shown in FIG. 8, the first switch SW1 includes a first end connected to an output terminal of the operation amplifier AMP, and a second end that is connected to a second switch SW2. In addition, the second switch SW2 that is selectively connected to the first power convertor 151 or second power convertor 153 by the timing controller 140 may be further connected to the output terminals of the first power convertor 151 and second power convertor 153. As shown in FIG. 8, the second switch SW2 is also connected to the first switch SW1. The first and second switches SW1 and SW2 may receive a control signal according to the I2C communication standard from the timing controller 140.

Meanwhile, in the illustrated embodiment, the switching transistor T is connected to the output terminal of the operational amplifier AMP via the first switch SW1, but the present embodiment is not limited thereto. That is, in another embodiment, the switching transistor T may be directly connected to the output terminal of the operational amplifier AMP.

In an embodiment, the compensation value VC output from the operational amplifier AMP may gradually increase with deterioration detection. In particular, when abnormal deterioration such as a short circuit occurs in the monitoring transistor Tm, the compensation value VC may greatly increase. When the compensation value VC increases to a predetermined level (e.g., a predetermined threshold value)

or more and reaches (e.g., matches) the turn-on level of the switching transistor T, the switching transistor T is turned on. That is, the switching transistor T turns on responsive to the driving voltage VDD that is compensated with the compensation value VC reaches the turn-on level of the switching transistor T. Then, a current path is formed from the high-potential voltage to the monitoring input pin Monitor of the timing controller 140, and a signal (e.g., an enable signal) having a predetermined voltage level or higher is input to the monitoring input pin Monitor. That is, when the compensation value VC is set high due to abnormal deterioration of the monitoring transistor Tm, an enable signal may be input to the monitoring input pin Monitor of the timing controller 140.

The timing controller 140 may detect deterioration and/or failure of the monitoring transistor Tm itself through the enable signal input to the monitoring input pin Monitor. In other words, the monitoring unit 160 outputs the enable signal when the compensation value VC output from the voltage compensator 152 is equal to or greater than a predetermined level, and the timing controller 140 may determine the deterioration of the monitoring transistor Tm based on the enable signal (in other words, based on the level of the compensation value VC). In this case, the timing controller 140 may control the driving voltage of an appropriate level from the second power convertor 153 to be directly applied to the gate driving circuit 130 instead of the abnormally raised compensation value VC. A detailed description of the above process is as follows.

First, the timing controller 140 may turn on the first switch SW1 to connect the output terminal of the operational amplifier AMP and the gate electrode of the switching transistor T. Then, the compensation value VC output from the operational amplifier AMP may be applied to the gate electrode of the switching transistor T. In this case, the second switch SW2 is connected to the first power converter 151 so that the high-potential voltage VDD generated by the first power converter 151 is connected to the output terminal of the operational amplifier AMP. Accordingly, the compensation value VC output from the operational amplifier AMP is added to the high-potential voltage VDD output from the first power convertor 151, and the compensated high-potential voltage VDD' is applied to the gate driving circuit 130.

When the enable signal is not applied to the monitoring input pin Monitor, the timing controller 140 connects the second switch SW2 to the first power converter 151 so that the first power converter 151 is connected to the output terminal of the operational amplifier AMP. Accordingly, the sum of the high-potential voltage VDD generated from the first power converter 151 and the compensation value VC output from the power compensator 152 is applied to the gate driving circuit 130 as the compensated high-potential voltage VDD'.

When the enable signal is applied to the monitoring input pin Monitor, the timing controller 140 turns off the first switch SW1 and may connect the second switch SW2 to the second power converter 153. Also, the timing controller 140 may control the second power converter 153 to output the high-potential voltage VDDr of a preset level. Then, the compensation value VC generated by the power compensator 152 is not reflected in the high-potential voltage VDD, and the high-potential voltage VDDr of a predetermined level output from the second power converter 153 is applied to the gate driving circuit 130.

In an embodiment, when determining a voltage level (e.g., a DC voltage level), the timing controller 140 may use the accumulated data of the display panel 110. The data accumulation amount may be, for example, the total amount of data voltages applied to the display panel 110, and may be variously selected as long as they reflect the stress index of the display panel 110. The greater the data accumulation amount, the greater the deterioration of the display panel 110, and consequently indicates that a higher driving voltage should be applied to the gate driving circuit 130. Accordingly, the timing controller 140 may determine the level of the voltage to be output by the second power convertor 153 based on the data accumulation amount.

In an embodiment, the voltage level may be preset in correspondence to one or more sections of the data accumulation amount. For example, the voltage level may be preset to different values each value corresponding to one of the eight sections of the data accumulation amount. Here, the preset voltage levels are set such that the voltage level increases as the data accumulation amount increases.

The preset voltage levels may be represented by digital data, for example, n-bit binary data, and when 8 voltage levels are set, the voltage levels may be represented by 3-bit binary data. Table 1 below shows an example (a look-up table) for 8 voltage levels represented by 3-bit binary data.

TABLE 1

| |
|---|
| 000: 0.48 V (SPEC: 0.5 V) |
| 001: 3.03 V (SPEC: 3.14 V) |
| 010: 6.12 V (SPEC: 6.285 V) |
| 011: 9.22 V (SPEC: 9.428 V) |
| 100: 12.3 V (SPEC: 12.57 V) |
| 101: 15.38 V (SPEC: 15.71 V) |
| 110: 18.47 V (SPEC: 18.85 V) |
| 111: 21.55 V (SPEC: 22 V) |

As described above, in the display device 100 according to an embodiment, in the case where deterioration detection is inaccurate due to deterioration of the monitoring transistor Tm disposed on the display panel 110 and the compensation value VC unnecessarily increases, the timing controller 140 detects such case and blocks the output of an inaccurate compensation value VC, and supplies a predetermined DC voltage corresponding to the accumulated stress of the display panel 110 through the second power converter 153 to the gate driving circuit. 130, so that the reliability of the gate driving circuit 130 can be improved.

In the display device according to the embodiments, a proper driving voltage is applied to the gate driving circuit by determining that a circuit element itself that senses deterioration of the gate driving circuit is abnormally deteriorated.

In addition, the display device according to the embodiments may implement a low-power display device by preventing unnecessary deterioration and power consumption of the gate driving circuit.

Although embodiments of the disclosure have been described with reference to the accompanying drawings, it should be understood that the above-described technical configuration of the disclosure can be implemented in other specific forms by those skilled in the art without departing the technical spirit or essential features of the disclosure. Thus, the embodiments described above should be construed as exemplary in every aspect and not limiting. Furthermore, the scope of the disclosure is defined by the appended claims rather than the above detailed description. Thus, the disclosure should be construed to cover all modifications or variations induced from the meaning and range of the appended claims and their equivalents.

What is claimed is:

1. A display device comprising:

a display panel including a pixel;

a gate driving circuit including a stage circuit, the stage circuit configured to output a gate signal to the pixel according to voltages of a Q node and a QB node of the stage circuit;

a monitoring transistor disposed in the display panel and including a gate electrode that is connected to at least one of the Q node and QB node of the stage circuit of the gate driving circuit, the monitoring transistor configured to output a monitoring voltage based on the voltages of the Q node and the Qb node of the stage circuit of the gate driving circuit;

a power control circuit configured to generate a compensation value that compensates a driving voltage according to the monitoring voltage output from the monitoring transistor, and outputs the driving voltage compensated with the compensation value to the gate driving circuit; and a timing controller configured to detect an abnormal state of the monitoring transistor based on the compensated driving voltage and controls whether the compensation value is output to compensate the driving voltage.

2. The display device of claim 1, further comprising:

a monitoring circuit configured to output an enable signal to the timing controller responsive to the compensation value being at least a predetermined threshold value.

3. The display device of claim 2, wherein the power control circuit includes:

a first power converter configured to convert an external voltage to a driving voltage and output the driving voltage; and a power compensator circuit configured to output the compensation value based on the monitoring voltage.

4. The display device of claim 3, wherein the monitoring circuit includes a switching transistor comprising a first electrode connected to a preset reference voltage, a second electrode connected to the timing controller, and a gate electrode connected to an output terminal of the power compensator circuit.

5. The display device of claim 4, wherein the switching transistor is turned on responsive to the compensation value output from the power compensator circuit increasing to a gate-on voltage of the switching transistor, and the switching transistor outputs a predetermined voltage to the timing controller as the enable signal.

6. The display device of claim 5, wherein the power control circuit further includes a second power converter configured to output a driving voltage having a preset level indicated by the timing controller, and the timing controller blocks the output of the compensation value responsive to the enable signal and controls the second power converter to output the driving voltage of the preset level.

7. The display device of claim 6, wherein the driving voltage of the preset level is based on a total amount of data voltages applied to the display panel.

8. The display device of claim 7, wherein the driving voltage of the preset level is preset to different values corresponding to one or more sections of the total amount of the data voltages.

9. The display device of claim 7, wherein the timing controller outputs digital data indicating the preset level of the driving voltage to the second power converter based on a look-up table that defines the driving voltage of the preset level corresponding to the total amount of the data voltages.

10. The display device of claim 6, wherein the power compensator circuit includes an operational amplifier that is connected to one electrode of the monitoring transistor and receives the monitoring voltage from the one electrode, and the power compensator circuit outputs the compensation value based on a difference between the monitoring voltage and a reference voltage.

11. The display device of claim 10, further comprising:

a first switch connected to an output terminal of the operational amplifier; and a second switch selectively connected to either an output terminal of the first power converter or an output terminal of the second power converter, wherein the timing controller turns off the first switch and connects the second switch to the output terminal of the second power converter to output the driving voltage of the preset level.

12. The display device of claim 1, wherein the stage circuit includes:

a buffer circuit including a pull-up transistor connected to the Q node and a pull-down transistor connected to the QB node to output the gate signal; and a control circuit configured to control the voltages of the Q node and QB node based on the driving voltage compensated according to the compensation value.

13. The display device of claim 12, wherein the monitoring transistor has a same characteristic as the pull-up transistor or a same characteristic as the pull-down transistor.

14. The display device of claim 13, wherein the monitoring transistor deteriorates a same as the pull-up transistor or the pull-down transistor.

15. A display device, comprising:

a gate driving circuit including a stage circuit, the stage circuit configured to output a gate signal to a pixel according to voltages of a Q node and a QB node of the stage circuit;

a monitoring transistor disposed in a display panel and including a gate electrode connected to at least one of the Q node and QB node of the stage circuit of the gate driving circuit, the monitoring transistor configured to output a monitoring voltage that is indicative of a deterioration of the gate driving circuit;

a power control unit configured to receive the monitoring voltage and generate a compensation value corresponding to monitoring voltage that is indicative of the deterioration of the gate driving circuit, and outputs a driving voltage that is compensated with the compensation value to the gate driving circuit;

a monitoring circuit configured to detect an abnormal state of the monitoring transistor based on the compensation value; and a timing controller that blocks an output of the compensation value and outputs a driving voltage of a preset level to the gate driving circuit responsive to detection of the monitoring transistor being in the abnormal state by the monitoring circuit.

16. The display device of claim 15, wherein the driving voltage of the preset level is determined based on a total amount of data voltages applied to a display panel included in the display device.

17. The display device of claim 16, wherein the driving voltage of the preset level is preset to different values corresponding to one or more sections of the total amount of the data voltages.

18. A display device comprising:

a display panel including a pixel;

a gate driving circuit including a stage circuit that is configured to output a gate signal to the pixel according to voltages of a Q node and a QB node of the stage circuit;

a monitoring transistor included in the display panel and connected to the Q node or the QB node of the stage circuit, the monitoring transistor configured to output a monitoring voltage based on one of a voltage of the Q node or a voltage of the QB node;

a power control circuit including an amplifier having a first input that receives the monitoring voltage and a second input that receives a reference voltage, the power control circuit configured to output a compensation value based on a difference between the monitoring voltage and the reference voltage, and outputs a driving voltage that is compensated with the compensation value to the gate driving circuit;

a monitoring circuit including a plurality of resistors connected in series and a switching transistor, the switching transistor including a gate electrode connected to the plurality of resistors, a first electrode connected to a predetermined voltage, and a second electrode that outputs an enable signal that is indicative of an abnormal state of the monitoring transistor responsive to the compensated driving voltage matching a turn-on voltage of the switching transistor; and a timing controller that is connected to the monitoring circuit and is configured to control the power control circuit to switch from outputting the driving voltage that is compensated with the compensation value to outputting a predefined driving voltage to the gate driving circuit responsive to receiving the enable signal from the monitoring circuit.

19. The display device of claim 18, wherein the power control circuit further comprises:

a first power converter configured to convert an external voltage to a driving voltage without compensation and output the driving voltage;

a second power converter configured to output the predefined driving voltage;

a first switch connected to an output terminal of the amplifier; and a second switch having a first end connected to the first switch and a second end that is selectively connected to either the first power converter or the second power converter, wherein the timing controller is configured to turn off the first switch and connect the second switch to the second power converter responsive to receiving the enable signal.

* * * * *